United States Patent
Wolski et al.

(10) Patent No.: US 9,953,420 B2
(45) Date of Patent: Apr. 24, 2018

(54) CAMERA CALIBRATION

(71) Applicant: Ford Global Technologies, LLC, Dearborn, MI (US)

(72) Inventors: Brian Wolski, Dearborn, MI (US); Joel Matthew Bickmann, Sterling Heights, MI (US); Aaron L. Mills, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 534 days.

(21) Appl. No.: 14/607,095

(22) Filed: Jan. 28, 2015

(65) Prior Publication Data
US 2015/0279035 A1    Oct. 1, 2015

Related U.S. Application Data

(60) Provisional application No. 61/969,956, filed on Mar. 25, 2014.

(51) Int. Cl.
*G06T 7/00* (2017.01)
*G01B 11/06* (2006.01)
(Continued)

(52) U.S. Cl.
CPC ........ *G06T 7/0018* (2013.01); *G01B 11/0608* (2013.01); *G01B 11/27* (2013.01);
(Continued)

(58) Field of Classification Search
CPC .................. G06T 2207/30252; G06T 7/80
See application file for complete search history.

(56) References Cited

U.S. PATENT DOCUMENTS

| 2010/0245576 A1* | 9/2010 | Inui | G06T 7/0018 348/148 |
| 2010/0253784 A1* | 10/2010 | Oleg | H04N 7/163 348/187 |

FOREIGN PATENT DOCUMENTS

| JP | 2008209354 | 9/2008 |
| JP | 201474591 | 4/2014 |

OTHER PUBLICATIONS

Gremban et al., "Geometric camera calibration using systems of linear equations", IEEE Xplore Abstract (2 pages), Published in Robotics and Automation, 1988, Proceedings, 1988 IEEE International Conference, Apr. 24-29, 1988, Philadelphia, PA.

(Continued)

*Primary Examiner* — William C Vaughn, Jr.
*Assistant Examiner* — Jerry Jean Baptiste
(74) *Attorney, Agent, or Firm* — Frank A. MacKenzie; Bejin Bieneman PLC

(57) ABSTRACT

First and second angles are measured from a nominal camera centerline to respective first and second positions. The first position is determined by the camera locating a first centerpoint in a first board. The second position is determined by the camera locating a second centerpoint in a second board. The first and second angles, and first and second horizontal distances of the camera from the first board and the second board, respectively, are used to obtain a determined vertical distance and a determined angle. The determined vertical distance measures a distance from the second centerpoint to a point determined by an intersection of a first line through the second board and a second line that is parallel to the floor and has an endpoint at the camera. The determined angle measures an angle of between third line extending from the camera in the nominal position and the second line.

20 Claims, 3 Drawing Sheets

(51) Int. Cl.
    *G01B 11/27* (2006.01)
    *G06T 7/80* (2017.01)
(52) U.S. Cl.
    CPC ...... *G06T 7/80* (2017.01); *G06T 2207/10004* (2013.01); *G06T 2207/10016* (2013.01); *G06T 2207/30204* (2013.01); *G06T 2207/30244* (2013.01); *G06T 2207/30252* (2013.01)

(56) References Cited

OTHER PUBLICATIONS

Yeluri, Thesis entitled "Outdoor Localization Technique Using Landmarks to Determine Position and Orientation", Graduate School of the University of Florida, 2003.

* cited by examiner

CAMERA CALIBRATION

RELATED APPLICATION

This application claims priority to U.S. provisional patent application Ser. No. 61/969,956, filed Mar. 25, 2014, entitled "CAMERA CALIBRATION." The contents of the foregoing provisional patent application are hereby incorporated herein by reference in their entirety.

BACKGROUND

Various types of vehicles, such as cars, sport-utility vehicles, light, medium, and heavy-duty trucks, etc., may include exterior-facing cameras, e.g., mounted in a vehicle interior behind a windshield. Such cameras are used for a variety of operations, such as lane departure or lane keeping warnings, headlamp control (e.g., high-beam control), detecting traffic signs and signals, oncoming vehicles, etc. However, if a camera height and alignment angle (angle of the camera with respect to the horizon) is not properly determined, then the camera may not be able to provide accurate measurement and/or detection data (e.g., lateral distance from camera to lane marker) for operations such as the foregoing. A camera alignment angle may be determined by knowing a height of a camera, e.g., a distance from the ground at which the camera is mounted in a vehicle and parameters of a target board (distance, size). Thus, determining a camera alignment angle depends on a predictable vehicle height. However, some vehicles have many configurations and/or weights, and thus vehicle height at the end of assembly process, when a camera is typically calibrated, can vary significantly. Mechanisms are lacking for determining camera heights and/or alignment angles for vehicles where a height is unknown (e.g., without additional reference height measurements such as wheelhouse or vehicle ride height).

DRAWINGS

FIG. 1 discloses an exemplary system for determining an angle of camera misalignment and height.

DETAILED DESCRIPTION

Figure 1:
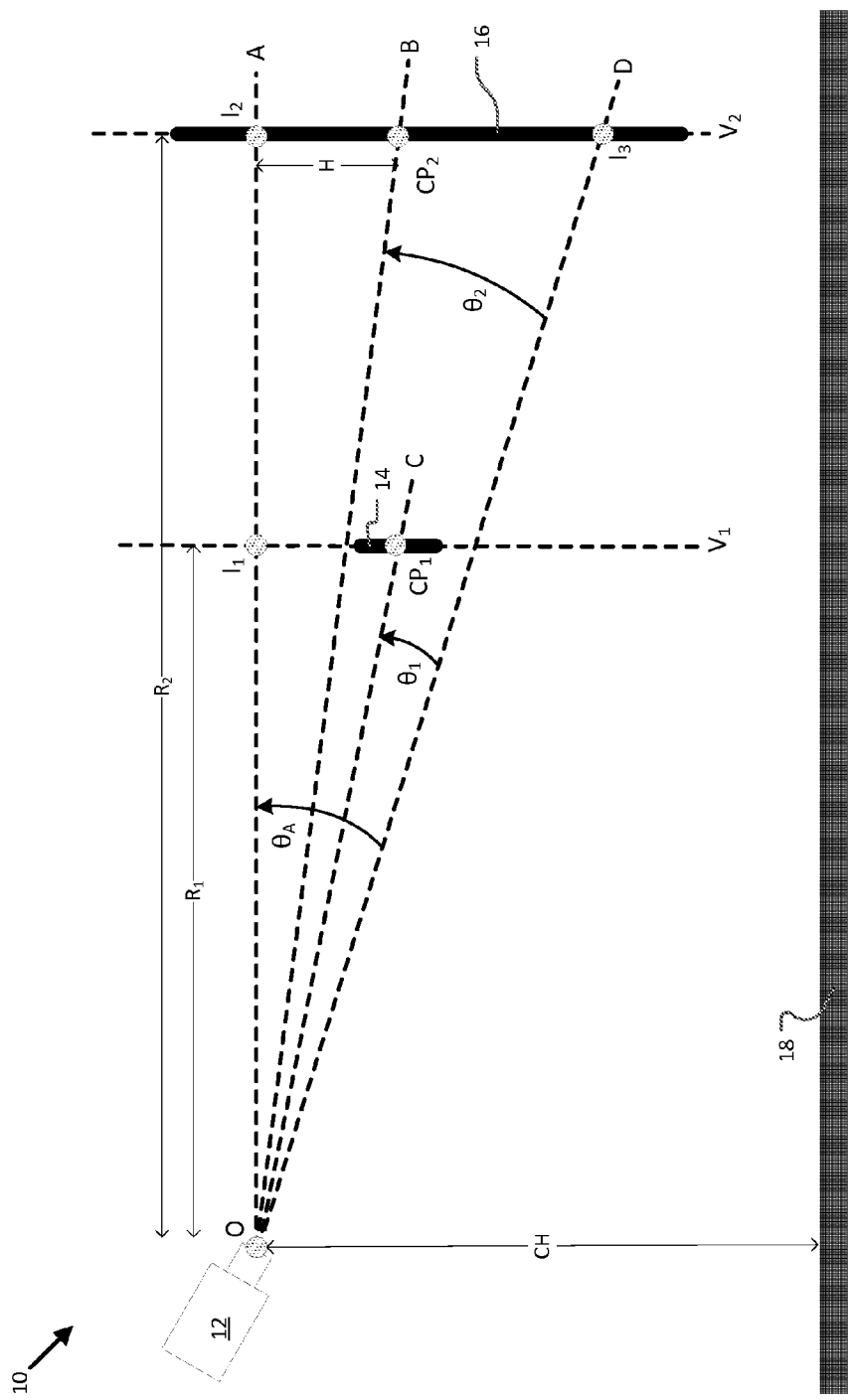

FIG. 1 discloses an exemplary system 10 for determining an angle of camera 12 misalignment and height, e.g., the camera 12 may be in a vehicle during, e.g., near the end of, an assembly process. The camera 12 is placed a first predetermined and known horizontal distance $R_1$ from a first camera target board 14, and a second predetermined and known horizontal distance $R_2$ from a second camera target board 16. The boards 14, 16 may be placed such that respective center points $CP_1$, $CP_2$ are a same vertical distance from a floor 18. Note that the center points $CP_1$, $CP_2$ may not be actual geometric centers of the boards 14, 16, but often are located generally at a center of the boards 14, 16, and in any case are referred to as center points herein for ease of reference, but could more generally be referred to as reference points. Moreover, note that the center points $CP_1$, $CP_2$ could be at different vertical distances from the floor 18, although it will be understood that locating the center points $CP_1$, $CP_2$ at a same vertical distance from the floor 18 simplifies calculations as described below.

Figure 2:
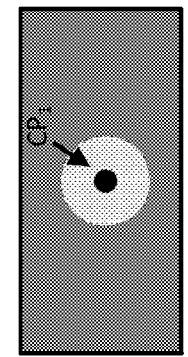
FIG. 2 illustrates an exemplary first camera target board included in the system of FIG. 1.
Figure 3:
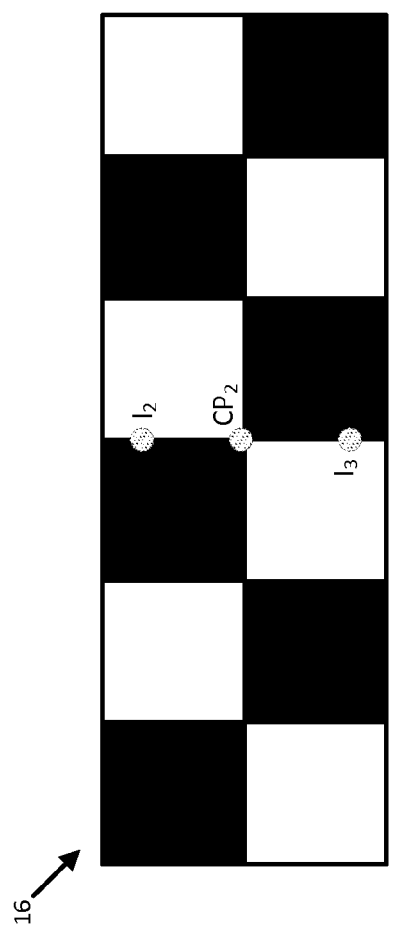
FIG. 3 illustrates an exemplary second camera target board included in the system of FIG. 1.

FIG. 2 illustrates an exemplary first camera target board 14 where the center point $CP_1$ is located with respect to a bull's-eye pattern. FIG. 3 illustrates an exemplary second camera target board 16 where the center point $CP_2$ is located with respect to a checkerboard pattern. Further, a point $I_3$ may indicate a nominal or starting point on which the camera 12 focuses, and a point $I_2$ may indicate a target or horizon point for orienting the camera 12. It is to be understood that, in implementation, the points $CP_2$, $I_2$, $I_3$ may be indicated via various shapes, patterns, etc., provided on the board 16, such as lines, bull's-eye patterns, etc. For example, the board 16 shown in FIG. 3 includes a checkerboard pattern, whereby the point $CP_2$ may be identified by the camera 12. The boards 14, 16, accordingly may be used to align the camera 12, whereby measurements may be made as described herein to thereby determine a height of the camera 12 with respect to the center points $CP_1$, $CP_2$, and thus a height of the camera 12 with respect to the floor 18.

As shown in FIG. 1, vertical axes $V_1$ and $V_2$ run through the boards 14, 16, respectively. A horizontal axis A extending from a point of origin O at the camera 12 intersects the vertical axis $V_1$ at a point $I_1$, and the vertical axis $V_2$ at a point $I_2$. The point of origin O is generally a center point of the camera 12 lens. The horizontal line A represents a horizon with respect to the camera 12, i.e., a horizontal orientation of the camera 12 if the camera 12 had an orientation parallel to the floor 18. A line D represents a so-called nominal, or centerline orientation of the camera 12 field-of-view as mounted in the vehicle, i.e., the camera 12 may be aligned with a point 13 on the board 16. A line C represents a line between the centerline of the camera 12 and a detected pattern at center point $CP_1$ on the target board 14. A line B represents a line between the centerline of the camera 12 and a detected pattern at center point $CP_2$ on the target board 16.

An angle $\theta_1$ is defined between the line D and the line C, i.e., the angle $\theta_1$ represents the angle from the nominal centerline of the camera 12 (line D) to the center point $CP_1$ of the board 14 (line C). Likewise, an angle θ2 represents the angle from the nominal centerline of the camera 12 (line D) to the center point of the board 16 (line B). As disclosed herein, mechanisms are provided for determining an angle $\theta_A$ between the nominal or starting position (line D) and a horizon, i.e., horizontal orientation of, the camera 12 (line A). Further, mechanisms are provided for determining a height H, i.e., a distance between a centerpoint $CP_2$ of the board 16 and the point 12 defining the horizon line A. By determining the height H, and knowing a distance of the centerpoint $CP_2$ from a floor 18, e.g., determined according to a location of the centerpoint $CP_2$ in the board 16, and a height at which the board 16 is suspended from the floor 18, a height CH of the camera 12 with respect to the floor 18 may thereby be determined.

The camera 12 may include a processor and a memory, the memory storing instructions for measuring angles $\theta_1$, $\theta_2$. For example, detecting the center points $CP_1$, $CP_2$, and measuring angles $\theta_1$, $\theta_2$, may be performed using standard image processing techniques, e.g., counting pixels a known center or point $CP_1$, $CP_2$, on a board 14, 16 and a location (e.g., row of pixels) at which a target feature (e.g., edge, crosshair, etc.) is detected on the board 14, 16. Instructions stored in and executable by the camera 12 may further use such measurements, along with data relating to the distances to obtain the height H and the angle $\theta_A$, e.g., as described below. The angle $\theta_A$ is sometimes referred to as a misalignment angle because it measure a difference between an actual and an expected, or ideal, alignment, of the camera 12. In any case, information including the angle $\theta_A$ and/or the height H may then be used by the camera 12 and/or other computing devices in a vehicle for using data from the camera 12 in performing various operations, e.g., monitoring lane changing, oncoming vehicles, traffic signs and/or stoplights, etc. Note that, additionally or alternatively, the camera could be communicatively coupled, e.g., via known wired or wireless connections, to a second device, e.g., a computing device comprising a processor and a memory and configured to perform some or all of the determinations disclosed herein based on measurements made by the camera 12.

For example, because the distances $R_1$, $R_2$ are known, as well as the angles $\theta_1$, $\theta_2$, the height H and the angle $\theta_A$ may be determined using algebra and trigonometry, as illustrated by the following equations. (Note that, although the tangent function is used in the illustrative equations below, other trigonometric functions could be used alone or in combination with one another, along with values for $R_1$, $R_2$, $\theta_1$, and $\theta_2$, that may be obtained as described above.)

$$\tan(\theta_A - \theta_1) = \frac{H}{R_1}; \quad \text{Equation (1)}$$

$$\tan(\theta_A - \theta_2) = \frac{H}{R_2}; \quad \text{Equation (2)}$$

$$H = R_1(\tan(\theta_A - \theta_1)) \quad \text{Equation (3);}$$

$$H = R_2(\tan(\theta_A - \theta_2)) \quad \text{Equation (4);}$$

Therefore:

$$R_1(\tan(\theta_A - \theta_1)) = R_2(\tan(\theta_A - \theta_2)) \quad \text{Equation (5);}$$

And, continuing with further forms of Equation (5), culminating in Equation (12), $$R_1[(\tan\theta_A - \tan\theta_1)/(\tan\theta_A \tan\theta_1 + 1)] = R_2[\tan\theta_A - \tan\theta_2)/(\tan\theta_A \tan\theta_2 + 1)] \quad \text{Equation (6);}$$

Let $x = \tan\theta_A$, $y = \tan\theta_1$, $z = \tan\theta_2$, then:

$$R_1[(x+y)/(xz+1)] = R_2[(x-z)/(xy+1)] \quad \text{Equation (7);}$$

$$R_1(zx^2 + x - yzx - y) = R_2(yx^2 + x - yzx - z) \quad \text{Equation (8);}$$

$$R_1 zx^2 + R_1 x - R_1 yzx - R_1 y = R_2 yx^2 + R_2 x - R_2 yzx - R_2 z) \quad \text{Equation (9);}$$

$$R_1 zx^2 + R_1 x - R_1 yzx - R_1 y - R_2 yx^2 - R_2 x + R_2 yzx + R_2 z = 0 \quad \text{Equation (10);}$$

$$x^2(R_1 z - R_2 y) + x(R_1 - R_2) - R_1 yzx - R_1 y + R_2 yzx + R_2 z = 0 \quad \text{Equation (11);}$$

and $$x^2(R_1 z | R_2 y) + x(R_1 - R_2) - x(R_1 yz + R_2 yz) - R_1 y + R_2 z = 0 \quad \text{Equation (12).}$$

Recall that $x = \tan\theta_A$. Therefore, from Equation 11, solving for x allows for a determination of OA. Further, once OA is known, the height H may be determined from any of Equations 1-4 above.

Figure 4:
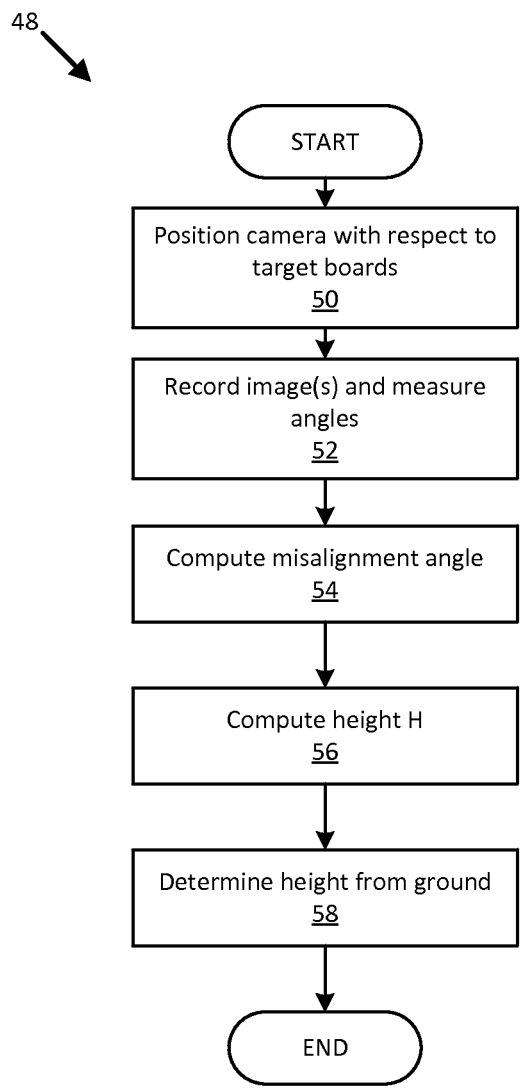
FIG. 4 illustrates an exemplary process for determining a camera angle and height.

FIG. 4 illustrates an exemplary process for determining a camera 12 angle $\theta_A$ and height. The process 48 begins in a block 50, in which a camera 12 is positioned. For example, a vehicle in a manufacturing process may be positioned with respect to the boards 14, 16, as described above.

Next, in a block 52, the camera 12 may record images from the boards 14, 16, as described above, and angles of orientation of the camera 12 may be measured as described above, e.g., the angles $\theta_1$, $\theta_2$.

Next in a block 54, the misalignment angle $\theta_A$ may be computed, e.g., according to equations such as Equations 1-12 as described above. For example, as stated above, the camera 12 could include a processor and a memory, where the memory was provided with instructions for computing the angle, as well as with data for computing the angle, including the distances $R_1$, $R_2$ as well as the recorded angles $\theta_1$, $\theta_2$.

Next, in a block 56, the camera 12 computes and stores the height H.

Next, in a block 58, the camera 12 computes a vertical height CH, illustrated in FIG. 1, based on the height H, representing a distance of the camera 12 from the floor 18, whereby the camera 12 may use the vertical height of the camera 12 in operations that use data from the camera 12.

Following the block 56, the process 48 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A computing device comprising a processor and a memory, wherein the computing device is programmed to:
   store in the memory a first horizontal distance of a camera from a first board and a second horizontal distance of the camera from a second board;
   receive first and second angles from a nominal camera centerline to respective first and second positions, the first position being determined by locating a first center point in the first board with the camera, and the second position being determined by locating a second center point in a second board with the camera;
   use the first and second angles, and first and second horizontal distances of the camera from the first board and the second board, respectively, to determine
      a vertical distance from the second center point to a point determined by an intersection of a first line through the second board and a second line that is parallel to the floor and has an endpoint at the camera, and
      a misalignment angle between a third line extending from the camera in the nominal position and the second line; and
   process the camera data according to the vertical distance and the misalignment angle.

2. The computing device of claim 1, wherein the first and second angles are determined by processing at least one image obtained by the camera.

3. The computing device of claim 1, wherein the computing device is further programmed to determine the misalignment angle by evaluating respective trigonometric functions of the first and second angles, and using the evaluated trigonometric functions and the first and second horizontal distances to determine a value of a trigonometric function of the misalignment angle.

4. The computing device of claim 3, wherein the computing device is further programmed to determine the misalignment angle by finding the tangent of the misalignment angle according to a form of the equation $$x^2(R_1z-R_2y)+x(R_1-R_2)-x(R_1yz+R_2yz)-R_1y+R_2z=0,$$

wherein $x=\tan\theta_A$, $y=\tan\theta_1$, $z=\tan\theta_2$, and further wherein OA denotes the misalignment angle, $\theta_1$ denotes the first angle, and $\theta_2$ denotes the second angle.

5. The computing device of claim 1, wherein the computing device is included in the camera.

6. The computing device of claim 1, wherein the first center point of the first board is located a first vertical distance from a floor and the second center point of the second board is located a second vertical distance from a floor.

7. The computing device of claim 6, wherein the first vertical distance and the second vertical distance are a same vertical distance.

8. The computing device of claim 6, wherein the computing device is further programmed to use at least one of the first vertical distance and the second vertical distance to determine a height of the camera with respect to the floor.

9. A method implemented in a computing device that includes a processor and a memory, the method comprising:
   measuring first and second angles from a nominal camera centerline to respective first and second positions, the first position being determined by the camera locating a first center point in a first board, and the second position being determined by the camera locating a second center point in a second board;
   using the first and second angles, and first and second horizontal distances of the camera from the first board and the second board, respectively, obtaining a determined vertical distance and a misalignment angle; and
   processing the camera data according to the vertical distance and the misalignment angle;
   wherein:
   the determined vertical distance measures a distance from the second center point to a point determined by an intersection of a first line through the second board and a second line that is parallel to the floor and has an endpoint at the camera; and
   the misalignment angle measures an angle of between third line extending from the camera in the nominal position and the second line.

10. The method of claim 9, wherein the first and second angles are determined by processing at least one image obtained by the camera.

11. The method of claim 9, further comprising determining the misalignment angle by evaluating respective trigonometric functions of the first and second angles, and using the evaluated trigonometric functions and the first and second horizontal distances to determine a value of a trigonometric function of the misalignment angle.

12. The method of claim 11, wherein the computing device is further programmed to determine the misalignment angle by finding the tangent of the misalignment angle according to a form of the equation $$x^2(R_1z-R_2y)+x(R_1-R_2)-x(R_1yz+R_2yz)-R_1y+R_2z=0,$$

wherein $x=\tan\theta_A$, $y=\tan\theta_1$, $z=\tan\theta_2$, and further wherein OA denotes the misalignment angle, $\theta_1$ denotes the first angle, and $\theta_2$ denotes the second angle.

13. The method of claim 11, wherein the computing device is included in the camera.

14. The method of claim 11, wherein the first center point of the first board is located a first vertical distance from a floor and the second center point of the second board is located a second vertical distance from a floor.

15. The method of claim 14, wherein the first vertical distance and the second vertical distance are a same vertical distance.

16. The method of claim 14, further comprising using at least one of the first vertical distance and the second vertical distance to determine a height of the camera with respect to the floor.

17. A system, comprising:
   a first board that includes a first center point and a second board that includes a second center point;
   a camera that is located a first horizontal distance from the first board and a second horizontal distance from the second board; and
   a computing device comprising a processor and a memory, the memory storing the first and second horizontal distances, as well as instructions executable by the processor for:
      measuring first and second angles from a nominal camera centerline to respective first and second positions, the first position being determined by the camera locating the first center point, and the second position being determined by the camera locating the second center point; and
      using the first and second angles, and the first and second horizontal distances, obtaining a determined vertical distance and a misalignment angle; and
      processing the camera data according to the vertical distance and the misalignment angle;
   wherein:
      the determined vertical distance measures a distance from the second center point to a point determined by an intersection of a first line through the second board and a second line that is parallel to the floor and has an endpoint at the camera; and
      the misalignment angle measures an angle of between a third line extending from the camera in the nominal position and the second line.

18. The system of claim 17, wherein the first center point of the first board is located a first vertical distance from a floor and the second center point of the second board is located a second vertical distance from a floor.

19. The system of claim 18, wherein the first vertical distance and the second vertical distance are a same vertical distance.

20. The system of claim 18, wherein the instructions executable by the processor further include instructions for using at least one of the first vertical distance and the second vertical distance to determine a height of the camera with respect to the floor.

* * * * *

UNITED STATES PATENT AND TRADEMARK OFFICE
CERTIFICATE OF CORRECTION

PATENT NO. : 9,953,420 B2  
APPLICATION NO. : 14/607095  
DATED : April 24, 2018  
INVENTOR(S) : Brian Wolski et al.

Page 1 of 1

It is certified that error appears in the above-identified patent and that said Letters Patent is hereby corrected as shown below:

In the Specification

| | |
|---|---|
| Column 2, Line 42: | Replace "02" with --$\theta_2$--; |
| Column 3, Line 42, Equation (6): | After "$R_2$" insert --(--; |
| Column 3, Line 58, Equation (12): | Replace "|" with -- - --; |
| Column 3, Line 60: | Replace "OA" (both occurrences) with --$\theta_A$--; |

In the Claims

| | |
|---|---|
| Column 6, Line 7 (Claim 4): | Replace "OA" with --$\theta_A$--; and |
| Column 6, Line 62 (Claim 12): | Replace "OA" with --$\theta_A$--. |

Signed and Sealed this
Nineteenth Day of June, 2018

Andrei Iancu
*Director of the United States Patent and Trademark Office*